June 3, 1958 L. MONTERO 2,836,827
COLLAR STAYS AND METHOD OF MAKING THEM
Filed Oct. 17, 1955
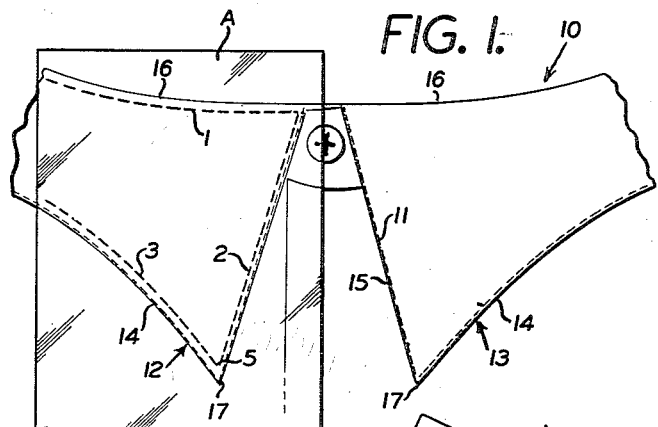
FIG. 1.
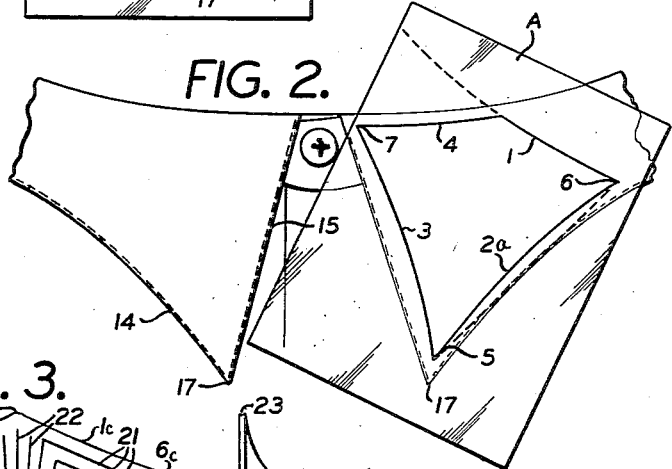
FIG. 2.
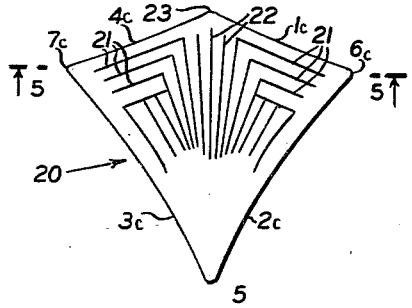
FIG. 3.
FIG. 4.
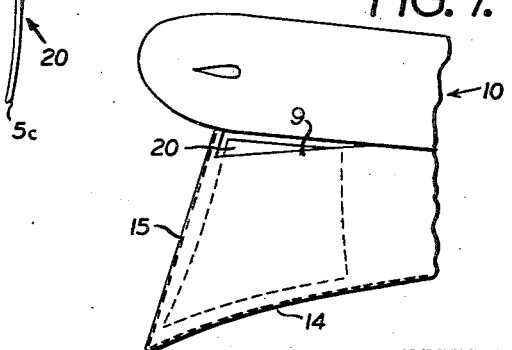
FIG. 7.
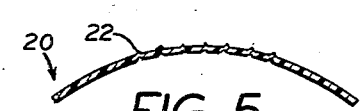
FIG. 5.
FIG. 6.
INVENTOR
LUIS MONTERO
BY Mock & Blum
ATTORNEYS.

United States Patent Office 2,836,827
Patented June 3, 1958

2,836,827

COLLAR STAYS AND METHOD OF MAKING THEM

Luis Montero, San Isido, Lima, Peru

Application October 17, 1955, Serial No. 540,697

5 Claims. (Cl. 2—132)

My invention relates to improvements in collar stays, and in particular to that type of collar stay which is intended to be inserted between the double fabric wall of a collar, especially a collar which is attached to a shirt or jacket.

The rapidity with which the collars of shirts lose their desired shape and neat appearance in wearing, has for many years been a matter of concern to shirt and collar manufacturers and the subject matter of many patents attempting to solve this problem, as in Heuman U. S. Patent No. 2,656,542 dated October 27, 1953. The fact that the conventional and widely-used collar stay is still a simple narrow strip of flexible material inserted diagonally between the front and rear walls of the collar, indicates that no practical solution of this problem has been found up to the present time.

There are certain common objections which are inherent in the wearing of soft collars, these being:

(1) Sagging of the upper fold edge of the collar on both sides of the button.

(2) Buckling of the collar along its length between the collar points and the portion of the collar underlying the jacket.

(3) Curling or lifting of the points of the collar.

These objections are due principally to the pressure of the collar against the chest. The conventional plastic tab or collar insert strip reinforces the collar at the collarbone of the wearer, preventing the collar points from curving or lifting, but it does not prevent the upper fold edge or the lower free edges of the collar from losing their shape or becoming deformed. It also has the disadvantage of bulging slightly through the front wall of the collar so that its presence within the collar can be seen.

It is an object of the present invention to provide an improved collar stay which will positively eliminate the three objections mentioned above in a practical and economical manner.

Another object of the invention is the provision of a collar stay shaped to conform exactly to the contour of the collar end, and capable of being used in either end of the collar.

According to my invention, I provide a collar stay which is made of thin, flexible and resilient material, such as a plastic, metal, vulcanized rubber, etc.

In use, one stay is inserted between the neckband of the collar and its front wall, at each end of the collar. The stays are designed so that they can be applied at either end of the collar. The collar is provided with two of said stays.

When the stay is in flat or planar shape, it has two relatively long concave edges which meet in a point. The straight chords of these concave edges form an acute angle.

When the stay is in said flat condition, it has two shorter, straight or substantially straight edges, which form an obtuse angle at another point of the stay. The straight line between said two points is the longitudinal axis of the stay, which has equal and identical parts of each side of said axis. Said additional edges may be concave, but their curvature is less than the curvature of the long edges which form the acute angle. Said additional short edges form acute angles with the chords of said long edges.

The long edges are of equal length and the short edges are of equal length.

The stay is dimensioned according to the collar shape.

When a stay is inserted between the neckband of the collar and its front wall, adjacent the button of the collar, one long edge is located inwardly of the respective end-edge of the front wall of the collar. As one example, the front wall of the collar may have straight end-edges, which diverge from the button in the usual manner. The other long edge of the stay is located above and substantially parallel to the respective part of the bottom edge of the front wall of the collar.

One short edge of the stay is located slightly below and substantially parallel to the fold of the collar. The other short edge is sharply inclined by said obtuse angle relative to the fold of the collar and the bottom edge of the front wall of the collar.

Due to its flexibility and resilience and shape, a stay can thus be held frictionally at each end of the front wall of the collar.

Other objects and advantages of the invention will become apparent in the course of the following specification when taken in connection with the accompanying drawings, in which:

Fig. 1 is a plan view of the front portion of a shirt collar, shown in flattened form, with a transparent sheet applied to one end of the collar for drawing a part of the collar-stay pattern thereon;

Fig. 2 is a plan view similar to Fig. 1, but showing the transparent sheet applied to the other end of the collar for completing the drawing of the collar-stay pattern;

Fig. 3 is a plan view of the collar stay formed from the pattern produced in Figs. 1 and 2;

Fig. 4 is a side elevation of the collar stay shown in Fig. 3;

Fig. 5 is a section taken along line 5—5 of Fig. 3;

Fig. 6 is an enlarged partial view of the section shown in Fig. 5, showing in detail one of the ribs formed in the collar stay; and Fig. 7 is an inside plan view of the shirt collar, showing the manner in which the collar stay is fitted within the pocket of said collar.

Figs. 1 and 3 are drawn substantially to scale. Fig. 3 shows the improved collar stay in flat shape, separated from the collar.

Fig. 1 illustrates the method of shaping and dimensioning the collar stay for a representative collar.

The collar 10 is of the usual soft material, with the usual neckband or rear wall connected to the front wall by the usual top fold 16. The collar has the usual seams 11 at the end-edges 15 of the front wall. These end-edges 15 are shown to be of straight shape, but the invention is not limited thereto, or to any shape of collar 10.

The front wall of collar 10 has end-parts 12 and 13. In the embodiment of collar 10 shown in Figs 1 and 2, the front wall has concave bottom edges 14 in the end-parts 12 and 13.

The first step in the method of forming a collar stay to conform to the shape and dimensions of the collar 10, is the application of a sheet of transparent material A either to the end-part 12 or the end-part 13. For purposes of illustration, the sheet A is shown in Fig. 1 as first placed over the end-part 12 of the collar 10, while the collar is in flat buttoned form.

Lines 1, 2, and 3 are then drawn on sheet A. These lines 1, 2 and 3 are respectively parallel to and spaced inwardly from the fold-line 16, end-edge 15 and bottom edge 14 of end-part 12 lines 2 and 3 are spaced inwardly from the respective seams at edges 15 and 14. In this embodiment, the line 3 is concave, because the respective part of the edge 14 is concave. When collar 10 is in said flat buttoned form, the end-edge 15 may be straight or concave, in the illustrated collar 10, said end-edge 15 being straight and the line 2 also being drawn straight and parallel thereto.

It will be observed that the angle formed at the juncture of lines 2 and 3, at point 5, is acute and is equal to the angle at the respective point 17 of collar 10.

The sheet A is then removed from the end-part 12 of collar 10, and without being inverted, is transferred to the end-part 13 of said collar 10, as shown in Fig. 2. In so transferring the sheet A, the marked angle 5 is made to coincide with the angle of the collar point 17 of end-part 13, with the result that the line 2 is now adjacent the bottom edge 14 of the end-part 13, the line 3 is now adjacent the end-edge 15 of the end-part 13, and the line 1 extends angularly across the end-part 13.

The original line 2, which is substantially straight in this embodiment, is erased and replaced by a new line 2a which is concave in this example, and which is parallel to the bottom edge 14 of the end-part 13. Said new line 2a is spaced inwardly from any seam at said edge 14.

A new line 4 is now drawn substantially parallel to fold-line 16, connecting the lines 1 and 3. Said line 4 completes the pattern for the improved collar stay, on the sheet A, as shown in Fig. 2.

In the finished pattern, and in the collar stay to be formed therefrom, the angle at its point 5 is equal to the angle at each point 17 of the collar 10. It will be noted that when the original lines 1, 2, and 3 are drawn on sheet A, the angle at point 5 is equal to the angle at the respective collar point 17, so that sheet A can be accurately registered when it is transferred from end-part 12 to end-part 13.

In the finished pattern, the angle 7 is equal to the angle between the end-edge 15 of the collar and the fold line 16. The angles 6 and 7 are equal.

It will thus be seen that on sheet A, the intersecting lines 1, 2, 3, and 4 now form a symmetrical quadrilateral in which lines 2 and 3 are of equal length and of the same curvature, and the lines 1 and 4 are also of equal length and of the same curvature.

The quadrilateral drawn on sheet A is then used as a pattern to form the finished collar stay 20 which is shown in Fig. 3. This collar stay 20 consists of a thin flexible and resilient sheet made of a suitable material such as plastic, stainless steel, vulcanized rubber, or the like. I have found the most suitable material for this purpose to be sheets of vinyl derivatives which are not deformed by heat, with a thickness not exceeding .01 inch.

The collar stay 20 is preferably formed with sets of parallel grooves, as shown in Fig. 3 which rigidify the central portion of the collar stay, permitting it to be made of very thin material, particularly a flexible and resilient plastic, and yet to posses enough rigidity to serve its purpose. Certain portions of the collar stay, as the point 5 and the top edges, are left free of the grooves so that they have relatively greater flexibility. The grooves may be impressed or initially molded into the body of the collar stay as shown in Figs. 5 and 6, and their number and length will depend upon the shape of the collar and the type of material used in making the collar stay 20.

One set of grooves 21 have branches or legs which are arranged parallel to the upper edges 1 and 4 of the collar stay body and are intended to impart transverse flexibility to the collar stay 20 permitting it to adapt itself to the knot of the neck-tie, while at the same time rigidifying the collar stay 20 in a vertical direction so that the bottom point does not rise. The other group of grooves 22 are disposed angularly to the first group 21 and extend generally vertically toward the lower point 5, reinforcing the portion of the collar stay which overlies and forms a bridge over the collar bone and at the same time permitting slight outward bowing of the collar stay in a vertical direction which improves the appearance of the collar.

It will be noted that the set of vertical grooves 22 does not extend all the way to the bottom point 5, terminating an appreciable distance above this point 5. Thus the bottom point 5 is left with a relatively high degree of flexibility, so that it can adapt itself to the constant sliding of the collar points against the chest when the collar is being worn.

Fig. 7 shows the inner surface of the collar which may be provided with a slit or opening 9 adjacent its top edge to permit the collar stay 20 to be inserted between the collar walls. Due to the shape of the collar stays and the precision with which they fit the end portions of the collar, particularly the points of the collar, no additional seam is necessary to hold them in position, as is the case when the conventional strip-type collar tab is used. For the same reason and also due to the flexibility of the body material used, to make the stays 20, it is practically impossible to notice the presence of the collar stay within the collar.

The collar stay 20 has two long concave edges 2c and 3c which meet at a point 5c, forming an angle equal to the angle at each point 17 of the collar 10. The stay 20 has two short and substantially straight edges 1c and 4c which meet at point 23, forming an obtuse angle. An axial line between point 23 and 5c divides the stay 20 into two equal parts.

The stay is molded so as to have a normal resilient, arched shape, so that when the stay is placed on a flat surface it rests upon said surface at the junction point between the two long edges 2c and 3c, and the two junction points 6c and 7c between the long edges and short edges. The junction point 23 between the two short edges 1c and 4c is then above the flat supporting surface. When the stay is pressed into flat form, it springs back into normal arched shape.

It will be appreciated that since the point 5 of each collar stay 20 is equal in angle to the collar point 17, and the sides 2 and 3 of the collar stay conform in size and generally in shape to the edges of the collar, the collar stay 20 may be used indiscriminately at either end of the collar. That is to say, a pair of collar stays of identical size and shape may be respectively inserted in the ends of the collar and both will fit snugly within the collar ends against the seams which border the collar edges.

It will be noted that a small space remains between the upper edge of the collar stay and the top edge of the collar to provide clearance for the top fold of the collar.

While a preferred embodiment of the invention has been shown and described herein, it is obvious that numerous additions, changes, and omissions may be made in the invention without departing from the spirit and scope thereof.

What is claimed is:

1. A collar stay of thin flexible material in the shape of a symmetrical quadrilateral, having a pair of concave adjacent sides of the same size and degree of curvature meeting at an acute angle, and a pair of adjacent straight sides of the same size meeting at an obtuse angle, the straight sides being shorter than the concave sides, the straight sides meeting the concave sides at acute angles which are equal to each other, said collar stay also having rows of closely spaced ribs parallel to each other and parallel to and adjacent the straight sides, and a row of spaced ribs extending from said straight sides toward the juncture between the concave adjacent sides.

2. A method of making a collar stay for insertion within an end portion of a collar, each of said collar end portions having a top fold edge, a bottom edge, an end edge, and a point formed at the juncture of said bottom edge and end edge, said method comprising the steps of applying a transparent sheet overlying a first collar end portion, drawing on said sheet a first line parallel to the top fold edge, a second line parallel to said end edge, and a third line parallel to said bottom edge, said lines being inwardly spaced from their respective edges and the second and third lines meeting at an angle equal to the angle of the point of said first collar end portion, then removing the sheet from said first collar end portion and applying it to the opposite second collar end portion with the angle at the juncture of said second and third lines registering with the angle of the point of said second collar end portion and with the second line adjacent and substantially parallel to the bottom edge, the third line substantially parallel to and adjacent the end edge, and the first line extending angularly across the collar end portion, then connecting said second line to said first line to conform to the curvature of the bottom edge and drawing a fourth line parallel to the top fold edge to complete on said sheet a symmetrical quadrilateral figure, and then using said figure as a pattern to produce said collar stay.

3. A method of making a collar stay for insertion within an end portion of a collar, each of said collar end portions having a top fold edge, an arcuate bottom edge, a straight end edge, and a point formed at the juncture of the bottom edge and end edge, said method comprising the steps of applying a transparent sheet overlying a first collar end position, drawing on said sheet a first line parallel to the top fold edge, a second line parallel to said straight end edge, and a third line parallel to and conforming in curvature to said arcuate bottom edge, said lines being inwardly spaced from their respective edges and the second and third lines meeting at an angle equal to the angle of the point of said first collar end portion, then removing the sheet from said first collar end portion and applying it to the opposite second collar end portion with the angle at the juncture of second and third lines registering with the angle of the point of said second collar end portion and with the second line adjacent and substantially parallel to the bottom edge, the third line substantially parallel to and adjacent the end edge, and the first line extending angularly across the collar end portion, then connecting the second line to conform to the curvature of the bottom edge and drawing a fourth line parallel to the top fold edge to complete on said sheet a symmetrical quadrilateral figure, and then using said figure as a pattern to produce said collar stay.

4. A collar stay of thin flexible and resilient material in the shape of a symmetrical quadrilateral having a longitudinal center line, said stay having a first pair of adjacent edges disposed on opposite sides of said center line and of the same size and meeting at an acute angle, and a second pair of shorter edges disposed on opposite sides of said center line and meeting at an obtuse angle, said stay being laterally arched along substantially its entire length.

5. A stay according to claim 4, the corner point of the first pair of edges and the two side corner points being substantially co-planar, the corner point between the second pair of edges being disposed above the other three corner points when the stay is oriented in upwardly arched position.

References Cited in the file of this patent

UNITED STATES PATENTS

| 1,740,270 | Sarandeses | Dec. 17, 1929 |
| 1,968,519 | Frederick | July 31, 1934 |

FOREIGN PATENTS

| 720,656 | Great Britain | Dec. 22, 1954 |